United States Patent [19]

Nishikado et al.

[11] Patent Number: 5,012,405
[45] Date of Patent: Apr. 30, 1991

[54] FILE MANAGEMENT SYSTEM FOR PERMITTING USER ACCESS TO FILES IN A DISTRIBUTED FILE SYSTEM BASED ON LINKAGE RELATION INFORMATION

[75] Inventors: Takashi Nishikado; Megumu Kondo, both of Kawasaki; Kazuhiko Fukuoka, Machida; Fumiya Murata, Hadano, all of Japan

[73] Assignee: Hitachi, Ltd., Tokyo, Japan

[21] Appl. No.: 389,260

[22] Filed: Aug. 3, 1989

Related U.S. Application Data

[63] Continuation of Ser. No. 109,317, Oct. 19, 1987, abandoned.

[30] Foreign Application Priority Data

Oct. 17, 1986 [JP] Japan ................................. 61-24525

[51] Int. Cl.⁵ .............................................. G06F 15/20
[52] U.S. Cl. ................................. 364/200; 364/282.1; 364/283.1
[58] Field of Search .............................. 364/200, 900

[56] References Cited

U.S. PATENT DOCUMENTS 4,500,960 2/1985 Babecki et al. ..................... 364/200
4,536,837 8/1985 Olsen et al. ......................... 364/200
4,611,298 9/1986 Schuldt ............................... 364/900

OTHER PUBLICATIONS

Usenix, 1986, Conference Proceedings, pp. 248-259.

Primary Examiner—Raulfe B. Zache
Attorney, Agent, or Firm—Antonelli, Terry, Stout & Kraus

[57] ABSTRACT

In a file management system a plurality of information processing devices are provided with files of tree structure. The information processing devices are linked through a communication line and dispersed files are utilized by a plurality of users in common. Each of the users can construct his own file without having any influence on the others. A table is provided including a column indicating the relation of links for the case where an arbitrary branch of a tree structure, included within at least one information processing device, is linked with a part of files included within another information device and a column specifying groups, for which the relation of links is valid. Linking is only permitted for access demands from members belonging to the group for which the relation of links is indicated as valid, to the part of the files of the other information processing device.

17 Claims, 6 Drawing Sheets

FILE MANAGEMENT SYSTEM FOR PERMITTING USER ACCESS TO FILES IN A DISTRIBUTED FILE SYSTEM BASED ON LINKAGE RELATION INFORMATION

This is a continuation application of Ser. No. 07/109,317, filed Oct. 19, 1987, now abandoned.

BACKGROUND OF THE INVENTION

1. Field of the Invention

This invention relates to a file management system and more in detail to a file management system, in which a plurality of workstations, each of which includes a respective file, are linked through a network, and which is suitable for a plurality of users to share distributed files.

2. Description of the Prior Art

A file management system, which enables a plurality of users to share files distributedly stored in a plurality of memory devices, is disclosed e.g. in USENIX 1986, Conference Proceedings, pp. 248-259.

FIG. 4A and 4B illustrate the concept of file sharing according to the prior art. In FIG. 4A reference numerals 1a and 1b represent the structure of files stored in disk devices on different workstations, node 1 and node 2. Each workstation independently manages its local files in the tree structure form, and each structure of files 1a and 1b is equivalent to what is viewed by users at each workstation when each workstation is used as a stand-alone system. For example, a user at the node 1 views "A0", called a root file, at the root position of the file structure, and three files "A1","A2" and "A3" under "A0". These files are divided into two category files. The content of the directory file is the information to point other files and to construct tree structure. "A0", "B0", "B1" and "B2" in FIG. 4A are examples of directory files. All files at leaf positions of tree structure are not files in the other category except said directory files. Since there exists a directory file which points no file at present, the directory file may appear at leaf positions of tree structure. "A1" and "A3" in FIG. 4A are the examples.

Files which are not directory files are in the other category. Generally these files are called "ordinary files". They always appear at leaf positions of tree structure. In FIG. 4A "A2", "B11", "B12", "B13", "B21" and "B22" are the examples. Each of the files contains data base data, or some object program. Arbitrary types of data may be stored in the files. An user can read or write the files and if they contain object programs he can also execute the files. There also exits a special file which corresponds to a real device. For example, read or write request to a special file corresponding to a terminal is treated as getting an input from a keyboard or displaying image on a screen respectively.

A method for managing local files in each workstation is disclosed, e. g., in Communications of the ACM, Vol. 17, pp. 365-375, July 1974. FIG. 5 shows the method by using the example of the node 1 in FIG. 4A. To manage local files, file control information 20a, directory information 21a and file body 22a are stored in the local memory device 6a. File control information 20a is a set of file control tables (30a, 30b,....) corresponding to each file. Each file control table 30a consists of following fields:

file type, owner, protection, file size and address etc..

The file type field 31a corresponding to the file "A0" indicates "directory", and the file type field 31b corresponding to the file "A2" indicates "normal (ordinary)". Each data in address fields 32a and 32b indicates each address on the local memory device in which the content of each the file resides. For example, data on address field 32 b indicates that the content of the file "A2" resides in the area 40 in the file body area 22a.

Directory information 21a is the content of directory files. Reference numeral 40a shows the content of the directory file "A0". As stated above, a directory file contains the information for each file which is pointed by the directory file. Each information indicates what a name of the pointed file is and where a file control table for the pointed file is. In this example directory file "A0" contains the information for "A1", "A2" and "A3". Directory information 21a is distinguished from the file body 22a in this figure, but it does not mean that directory information and file body are physically separated.

Using the above method users can access any local file in each workstation by specifying a path from the root file to it on the tree structure. For example, the file "A2" (in FIG. 4A) can be specified with "A0/A2" from a user at the node 1. Omitting "A0" and specifying only "A2" is allowable in this example. A file control table for the root file "A0" is located at the predetermined position and an operating system can trace the specified path by reference file control tables and the contents of directory files corresponding to the path.

The above method enables users only to access local files stored in a workstation that the users are using, and the users cannot access remote files in another workstation. The reference numeral 3a in FIG. 4A represents a file link to extend the local file structure in node 1 to the structure including remote files in the node 2. The file link 3a links a subtree 2a, headed by a directory file "B2" in the structure of files 1b in node 2, to a branch "A1" in the structure of files 1a in the node 1. With this file link 3a, the file structure viewed from users at the node 1 becomes a new shape in which the subtree 2a is virtually attached under the directory file "A1" as shown in FIG. 4B. In other words, the file link 3a has an effect that a user can directly access to the file "B2" in the node 2. Therefore, users at the node 1 can specify and access the files "B2" and "B21" in the subtree 2a with names "A1" and "A1/B21" respectively.

FIG. 6 shows an embodiment of the file link. Before a file link is done, definitions of linkable subtrees are made at the workstation in which the subtrees reside. When a user program 12b makes a request of linkable subtree definition by specifying the head file of the subtree, for example, "B2" in FIG. 4A, the file system management program 90b searches the specified head file by referring file control information 20b and directory information 21h, and set the linkable subtree information to a management table. The management table 70 has columns to indicate a linkable subtree, accessibility to the subtree, etc. For example, the information of pointing to a file control table for the specified head file is registered in the column 71 to specify the linkable subtree.

Subtrees defined the above procedure are linkable from other workstations. For example, when a user program 12a at the node 1 makes a file link request, as shown in FIG. 4A, the file system management program 90a searches a destination file "A1" by referring file control information 20a and directory information 21a, and if found, sends a message to the file system management program 90a that a subtree headed by "B2" is requested to be linked, and waits for the answer from the file management program 90b. When the management program 90b receives the message, it checks the management table 70 and sends back the answer to the management program 90a, whether the request is granted or not. Receiving the answer, the management program 90a sets the file link information to a management table 60 if the request is granted, and answers the result to the user program 12a. The management table 60 has a column 61 for storing information indicating a destination file in the workstation, a column 62 for storing information indicating an original file to be linked in another workstation and a column 63 for storing information indicating the accessibility, etc. As for the column 61, for example, the information pointing to a file control table for a for a destination is used. As for the column 62, the information indicating a workstation in which an original file resides should be included as well as the information pointing a file control table for the file.

After the file link has been done, a file access request from a user program is treated as follows. When a user program 12a specified a file to be accessed, the file system management program 90a searches along the file tree structure by tracing a path name of the file one by one from a root file "A0". At each point of the tree, the management program 90a refers the management table 60 first. If there is no entry indicating said accessed file in link destination column 61 at the position that the management program 90a is currently processing, the management program 90a advances next position in the tree structure by referring file control information 20a and directory information 21a. If there is an entry indicating said accessed file, the management program 90a sends a file access message to a file system management program in another workstation in which the subtree indicated by an original file column of the matched entry resides, and waits for the answer. The file access message includes the following information:

1. the original file indicated by the matches entry; and
2. the remaining path name of the specified file which is not processed by the management program 90a.

When a file system management program in the another workstation receives the file access message, it searches the requested file from the position of the specified original file with the remaining path name passed by the message, and sends the answer. The algorithm of management program in the another workstation is the same as that in the management program 90a. When the answer is received, the management program 90a returns the result to the user program 12a. For example, when the user program 12a makes a file access request of "A2", the request is locally processed by the management program 90a. When the user program 12a makes a file access request of "A1/B21", however, the management program 90a finds at the position of "A1" that a file access message should be sent to a management program 90b. The message that the original file is "B2" and that the remaining path name is "B21". Receiving the message, the management program 90b starts accessing "B21" through "B2", and sends back the answer when the file management program 90b finds file "B21". In the above explanation, a user program which accesses a remote file by using the file link is the same program, but they may be different programs.

According to the conventional system described above, there is a problem that the extension of the file structure by the link of file structures has influence on all the users utilizing the same workstation. For example, in the case where a plurality of users utilize a workstation, if one of them effects the extension of the file structure, the file structure viewed from the other users varies without their knowing it. Further, in the case where a plurality of users utilize successively a workstation, if a preceding user has extended the file structure and leaves it as it is, this gives rise to a problem that the succeeding user utilizes the extended file.

SUMMARY OF THE INVENTION

The principal object of this invention is to provide a file management system permitting the construction of a file system belonging to only one user without having any influence on other users by linking a plurality of information processing devices provided with files of tree structure through a communication line and by using an information processing device.

In order to achieve the above object, the file management system according to this invention comprises a plurality of data processing devices, each of said data processing devices having file memory for storing some ordinary files (e.g., data base data file program file, etc.) and directory files for managing said ordinary files in tree structure; linkage memory for storing linkage relation between a directory file stored in each data processing device and a directory file stored in another data processing device according to an user or a user program (e.g., data base access program,) in response to a linkage request from said user or said user program. In addition, each of data processing devices has a central processing unit for judging, in response to a request to access a file directed by the directory file stored in another data processing device through the directory file in the data processing device from a user or a user program, whether the data processing device should request another data processing device to access the file directed by the directory file in the other data processing device by checking whether said directory file stored in the data processing device is linked with the directory file stored in the other data processing device according to the requesting user or user program.

In addition, the other data processing device comprises means for storing an indicator which indicates a count of the number of users or user programs accessing the file directed by the directory file stored in the other data processing device through the directory file stored in the data processing device by using the linkage relation, so that the linkage relation is automatically deleted when the indicator indicates a predetermined number (for example zero).

According to this invention, since the extension of the file structure based on the group specification (according to a user or user program) described above is perfectly invalid for the members outside of the group, it is possible to define freely the file structure without influencing no one other than the relating members of the group. Further, even if a user has left the release operation for the link undone, since the file structure becomes automatically invalid at the moment of termination of the processing for all the group members, it has no bad influence on succeeding processings.

The above-mentioned and other features and objects of this invention will become more apparent by reference to the following description taken in conjunction with the accompanying drawings.

DESCRIPTION OF THE PREFERRED EMBODIMENTS

Figure 1:
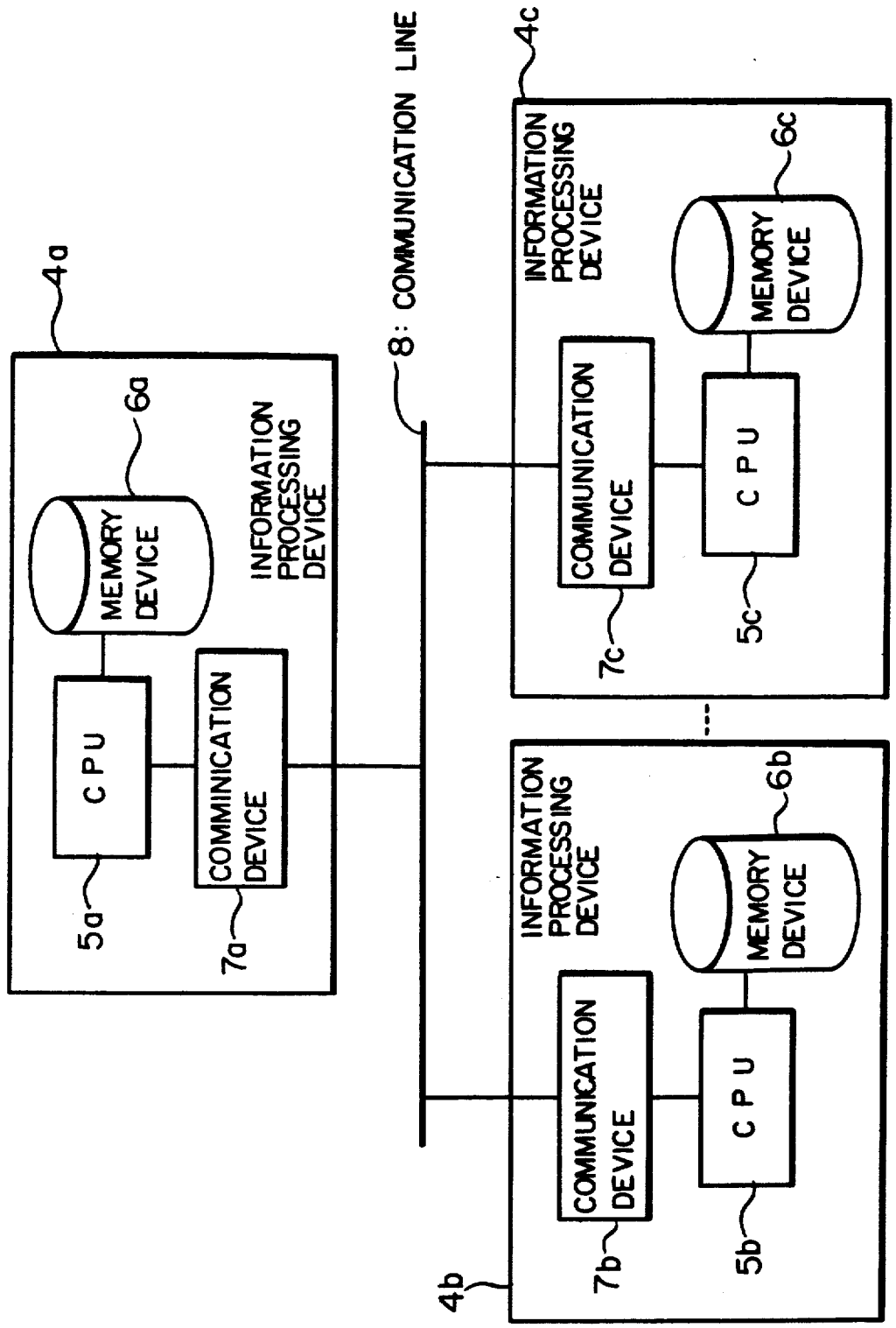
FIG. 1 is a scheme illustrating the construction of a signal processing system, in which a plurality of workstations, where this invention is realized, are linked through a communication line.

FIG. 1 is a scheme illustrating the construction of an information processing system, in which the file management system according to this invention is realized.

In FIG. 1, reference numerals $4a-4c'$ represents information processing devices, which are connected with a communication line 8 in common through communication devices $7a-7c$. Each of the information processing devices $4a-7c$ includes a memory device $6a-6c$ and thus files are stored in a distributed form under control of a file system management program provided in each of the central processing units $5a-5c$. The stored files contain several type files, for example, the files contain directory files and normal files like files of data base or program files such as the prior art described above. A file system management program communicates with the file system management program in another information processing device $4a-4c$ through the communication devices $7a-7c$ and the communication line 8, and utilizes the files distributedly stored in memory devices $6a-6c$ of the other information processing devices $4a-4c$. Users of each of the information processing devices $4a-4c$ can extend virtually the structure of files stored in the local memory device $6a-6c$ provided in each of the information processing devices by using the communication between file system management programs described above and access the file stored in another information processing device $6a-6c$.

Figure 2A:
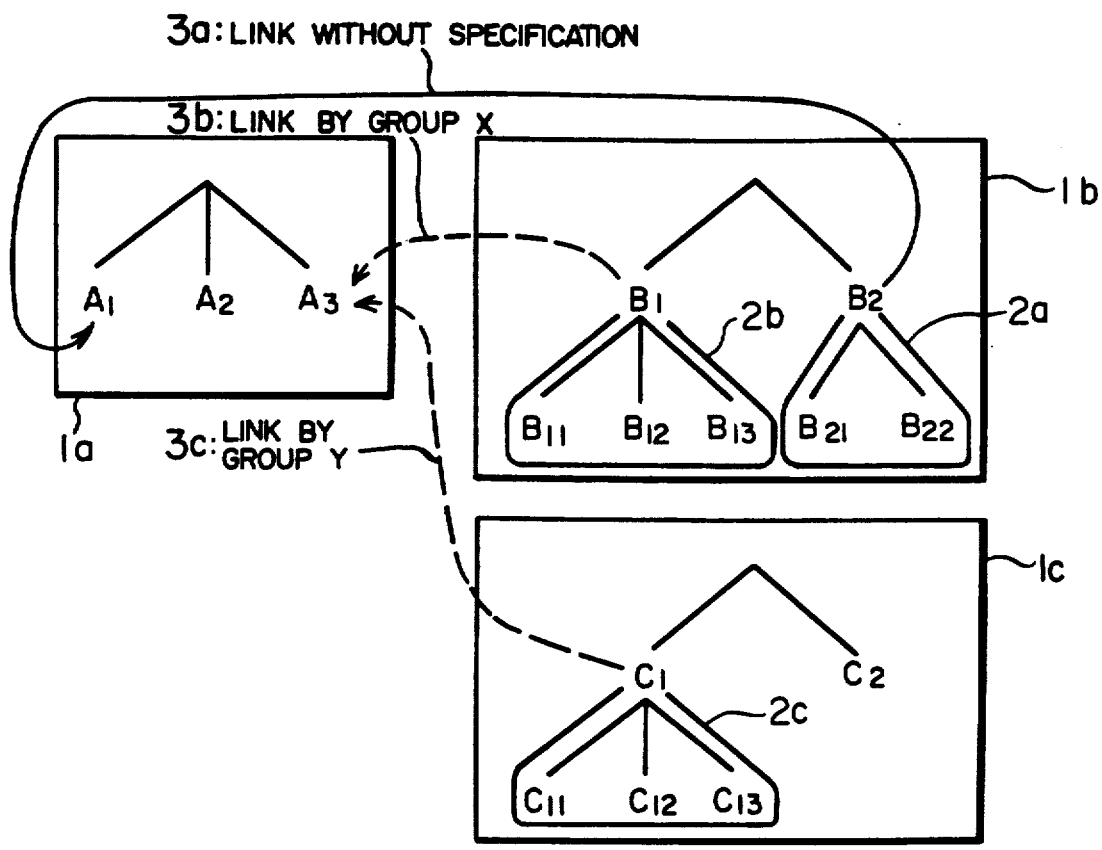
FIGS. 2A and 2B are schemes for showing conceptionally the link between files for explaining the file management system according to this invention.
Figure 2B:
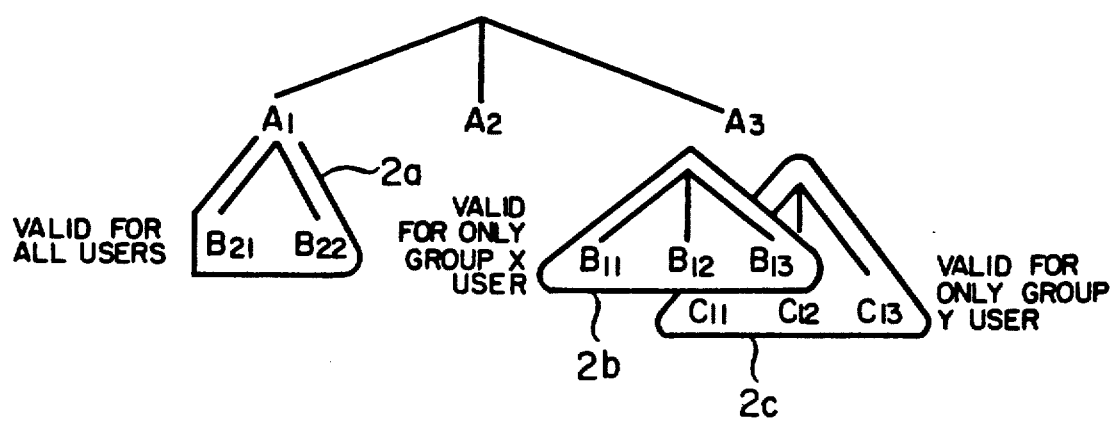

FIGS. 2A and 2B are schemes for explaining conceptually the functions of linking and extending files in the file management system according to this invention.

In FIG. 2A, reference numerals $1a-1c$ represent the structures of files which are stored in the memory devices $6a-6c$, respectively, indicated in FIG. 1, which are examples of the file structure visible as the initial state from users of each of the information processing devices $4a-4c$. Now, taking the file structure viewed by a user of the information processing device $4a$ as an example, it is explained for the case, where the file structure is virtually extended by linking subtrees $2a-2c$ in the structure of files $1b$ and $1c$ stored in the other information processing devices $4b$ and $4c$ to a part of the structure of files $1a$ stored in the information processing device $4a$.

In FIG. 2 characters including an underline, for example "A2", "B11"...etc., signify files of data base data or files of programs, characters including no underline, for example "A1", "A3", ...etc., signify directory files like the above-mentioned prior art.

The line indicated by reference numeral $3a$ in FIG. 2A means that the subtree $2a$ under $B_2$ in the structure of files $1b$ is linked to the branch $A_1$ in the structure of files $1a$. As a result the subtree $2a$ is attached virtually under the branch $A_1$. The line $3a$ described above shows a link without group specification and any user of the information processing device $1a$ can utilize the subtree $2a$ as if it is attached under branch $A_1$.

Figure 3:
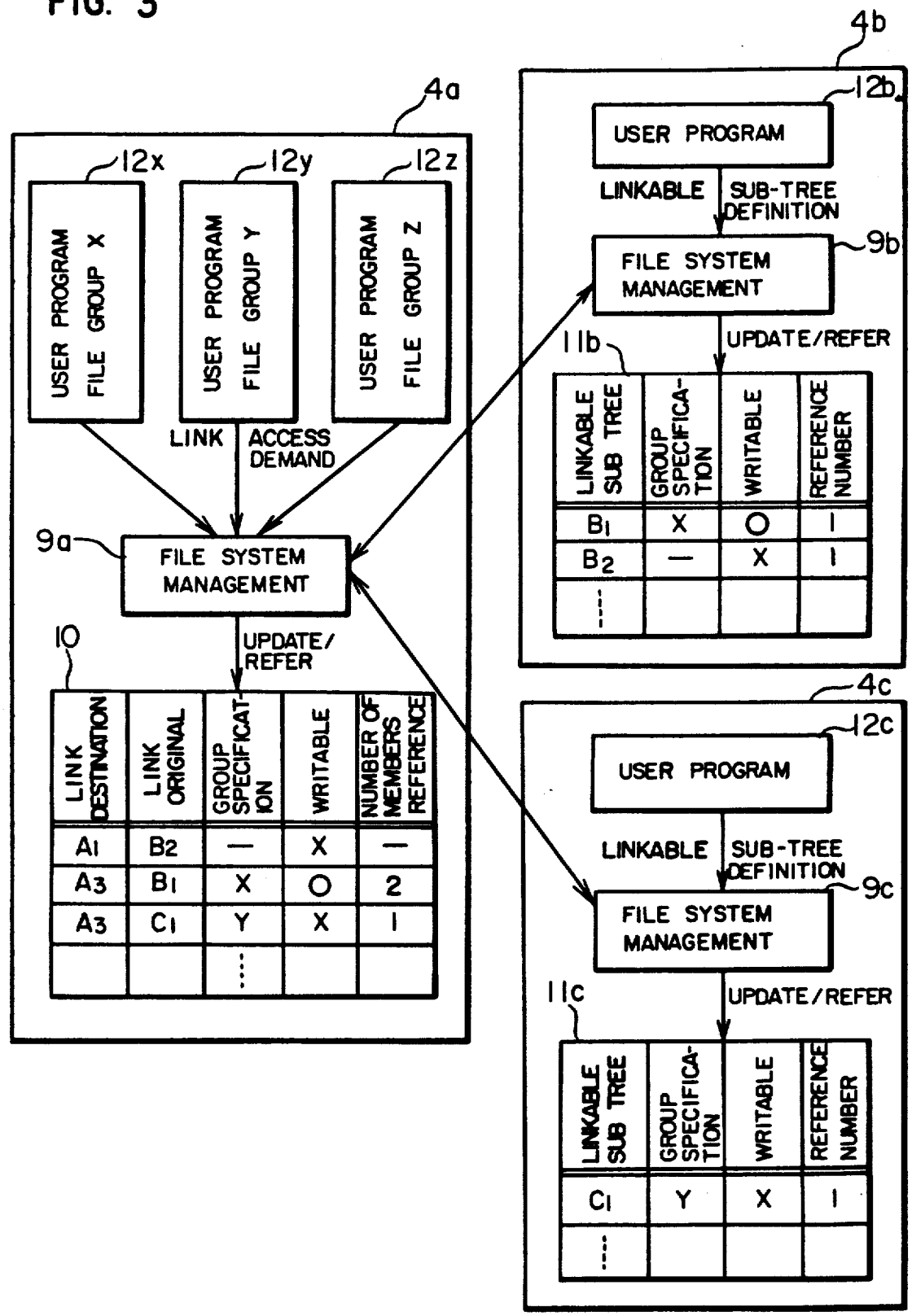
FIG. 3 is a scheme illustrating the construction of an embodiment of the file management system according to this invention.
Figure 4A:
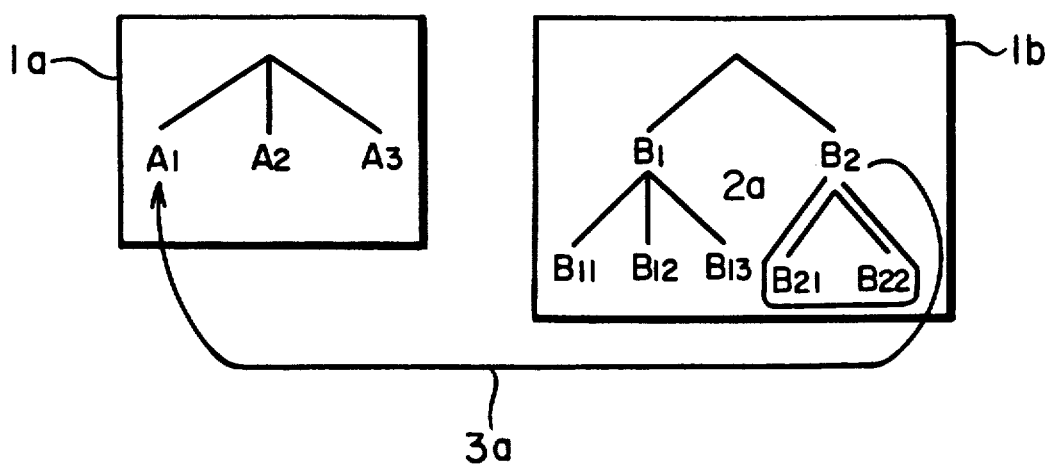
FIGS. 4A and 4B are schemes for explaining conceptionally the link of files in a prior art file management system.
Figure 4B:
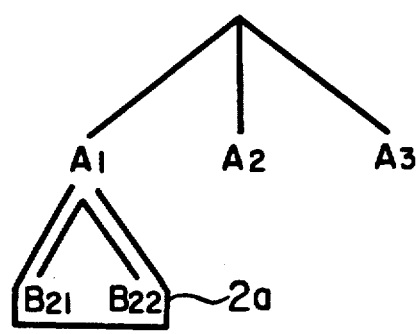
Figure 5:
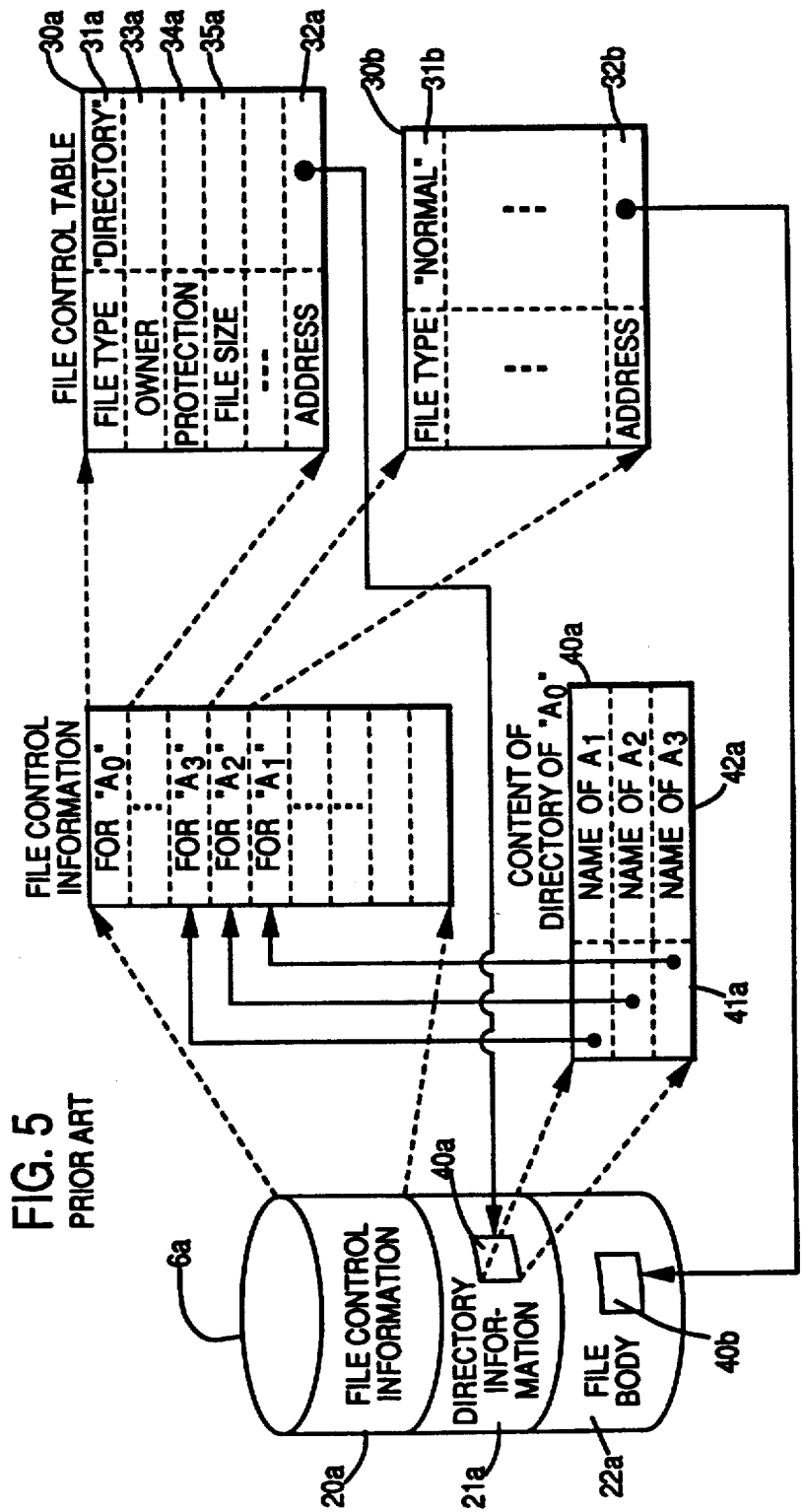
FIG. 5 is a scheme for explaining a method to manage local files in each workstation in said prior art file management system.
Figure 6:
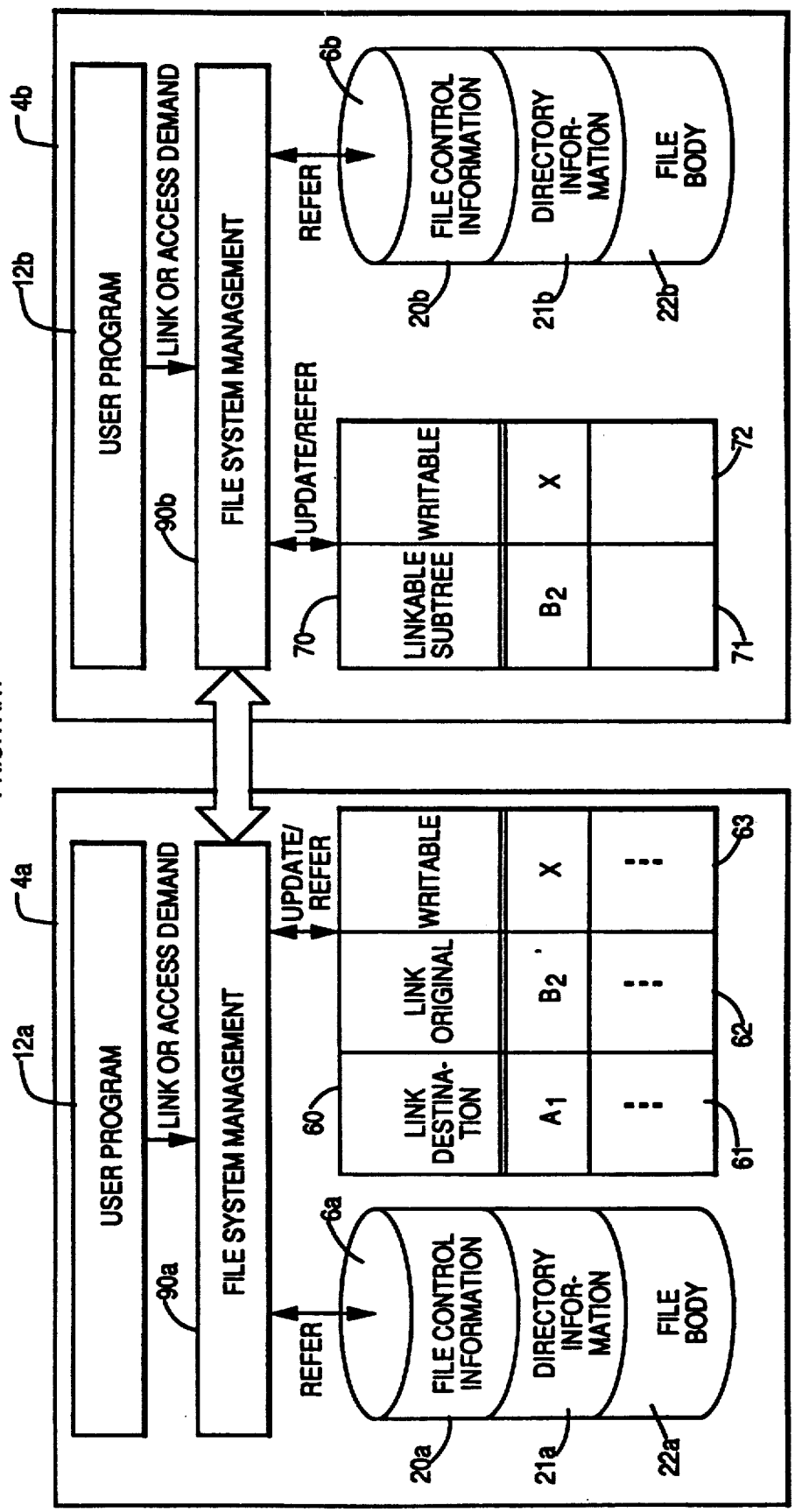
FIG. 6 is a scheme for explaining a linking operation between two workstations in said prior art file management system.

The broken lines indicated by reference numerals $3b$ and $3c$ in the figure mean that the subtree $2b$ and $2c$ in the structure of files $1b$ and $1c$, respectively, are linked to the branch in the structure of files $1a$. These differ from the link $3a$ in that at the link specification for the former the group is specified for restricting the valid range of the link. For example, a group X is specified for the link $3b$ and another group Y is specified for the link $3c$. In the case of the link $3a$ stated above, the result of the link has influence on all the users of the information processing device $1a$. On the contrary, when the group is specified as for the link $3b$ and $3c$, the link of the branch $A_3$ with the subtree $2b$ or that of the file $A_3$ with the subtree $2c$ is valid only for the users belonging to the group X or Y, as indicated in FIG. 2B. Consequently, when the group is specified, it is possible to link subtrees to a branch $A_3$ which are different for every group. Here a group means an assembly of users or an assembly of a plurality of programs for a series of works. It is also possible to define each of users as an independent group. Further, concerning the subtree, which will be an object of the link, it may be prevented that the files in the subtree are utilized from another without permission e.g. by declaring on the information processing device including the relevant subtree that any link thereof with another information processing device is not permissible Next, an embodiment of the file management indicated in FIGS. 2A and 2B will be explained below, referring to FIG. 3. In FIG. 3, reference numerals $4a-4c$ represent information processing devices, each of which is provided with a file system management program $9a-9c$, user programs $12x-12z$, $12b$, $12c$, and a management table 10, $11b$, $11c$. Now it is supposed that users of the information processing devices $4b$ and $4c$ send previously generated demands to the file system management programs $9b$ and $9c$ by using the programs $12b$ and $12c$, respectively in order to define the subtrees $2a$, $2b$ and $2c$ in FIG. 2A as linkable ones. The file system management program $9b$ and $9c$ of the devices $4b$ and $4c$ register information indicating their respective linkable subtrees in the management tables $11b$ and $11c$, respectively. Each of these tables consists of columns for storing information indicating linkable subtrees, groups which can access the defined subtrees (the entry "—" in this column means that all the users can access) and a column for storing information indicating whether it is writable. In these columns the information is set by the specification from the programs $12b$ and $12c$ described above is set. Further, in the table stated above there is a column for storing the number of references indicating how many information processing devices refer to the defined subtree. This column is cleared to zero in the initial state. In the case where the subtree defined as a linkable file is not referred to by another information processing device, i.e. in the case where the number of references is zero, the link permission may be deleted and the table may be amended so.

When the registration in the control tables $11b$ and $11c$ is terminated, the specification processing of the link relation is effected in the following way. For example, when the user program within the information processing device $4a$ demands the file system management program $9a$ to link the subtree $2b$ in FIG. 2A with $A_3$, the file system management program $9a$ effects an access right check to the branch $A_3$ and thereafter send a demand to link the subtree $2b$ to the file system management program $9b$ of the information processing device $4b$ including the subtree $2b$. The file system management program $9b$ effects the access right check of the groups, etc. according to the demand stated above. If there are no problems, it increases the number of references of the entry corresponding to the subtree $2b$ of the management table $11b$ by 1 and thereafter replies to the file system management program $9a$ that the link has been allowed. The file system management program $9a$, which has received the reply of permission, prepares an entry (information) indicating the file link relation in the management Table 10 on the basis of the information coming from the user program $12x$. This Table 10 consists of columns for storing information indicating the branch position of the link destination, information indicating the subtree with which it is to be linked, the group for which this link is valid (the entry "—" in this column means the link is valid for all the users), information indicating whether it is writable or not, and the number of members which are using the relevant link at present. The last mentioned column, say, the number of members can be used in such a way as it is prevented that the link is deleted during the reference of the file and at the same time, when the file is no more referred to, it is possible to invalidate automatically the relevant entry. Management similar to that described above for the subtree $2b$ is effected also for the other subtrees $2a$ and $2c$.

Now the management system will be explained for the case where a user program accesses a file in the subtree linked. Here it is supposed that the user program $12y$ demands an access to a file "$C_2$" specified with" $A_3/C_{12}$ (" / " represents a delimiter to separate the branch or file names specifying the path from root in the tree structure for each file) For this, file system management program searches the file in the managed file structure from the root and verifies whether the branch $A_3$ exists within the management Table 10 or not. In this case, since the group, to which user program $12y$ demanding the access belongs, is Y, it is judged that the second entry within the management Table 10 is invalid and the third entry is valid and thus the link with $C_1$ is permitted. Then the file management system program system program $9a$ demands an access to $C_{12}$, which is a subtree under $C_1$, to the file system management program $9c$ of the information processing device $4c$. The file system management program $9c$, which has received this demand, refers to the control Table $11c$ and carries out the demand after having checked the access right and returns the result to the file system management program $9a$ of the demander. The file system management program $9a$, which has received the result, replies it to the user program $12y$ and terminates the access demand processing Accordingly, the user program $12y$ can treat the file "$C_{12}$" within the processing device $4c$ as a file directed by the directory file "$A_3$". In the case where another user program $12z$ demands an access to the same file "$C_{12}$" specifying with" $A_3/C_{12}$, since there is no entry of $A_3$ corresponding to group Z within the management Table 10, the search of file $A_3/C_{12}$ within the memory device $6a$ (in FIG. 1) of the information processing device $4a$ finally results in that it is an undefined file and the access is treated as an access error. In the case where the user program $12x$ tries to access the file "$C_{12}$" specifying with $A_3/C_{12}$, too, since it is judged that $C_{12}$ is in the subtree under $B_1$ on the management Table 10 and an access is demanded to the file system management program $9b$, no relevant file is found and the access is treated similarly as an access error. On the other hand, concerning the subtree $2a$ in FIG. 2A, which is linked for all the users in common, considering e.g. an access to the file $A_1/B_{21}$, since "—" stands in the column for the group specification of the first entry within the management Table 10, an access demand from either one of the programs, $12x$, $12y$ and $12z$ is transmitted to the file system management program $9b$ and treated normally.

The setting of the file groups may be effected by the management with pass word e.g. by using a group identifier management file, etc. in the same way as user identifiers or user group identifiers. Further, in the case where the file access is allowed for a program executing a series of works, for example, a system call for setting a unique group identifier to these series of works is prepared.

According to the embodiment described above, since the file system $1a$, $1b$, $1c$ on each of the information processing devices is managed in an independent and equalized form under the system management program, even if an information processing device breaks down, an advantage can be obtained that accesses to the file system of other devices are performed normally.

According to this invention, when a file structure is virtually extended by linking a part of another file structure distributedly managed in other information processing devices with a local file structure, it is possible to specify whether the extension is valid for all the users or it is valid only for specified groups. Consequently not only the file structure can be extended so that all the users can utilize it in common, but also a file structure, which is utilized uniquely by a group, can be virtually constructed without having any influence on the others than the users concerned.

We claim:

1. A file management system for managing a plurality of tree structure files, each of said tree structure files including one directory file and at least one branch file directed by said directory file, said file management system comprising:

a plurality of processing means each having first memory means for storing a set of tree structure files; and line means, connected to said plurality of processing means, for transmitting data or commands between each of said plurality of processing means;

wherein at least a first one of said plurality of processing means includes linking means for providing linkage relation between a first file in said tree structure files in said first one of said processing means and a second file in said tree structure files in a second one of said plurality of processing means in response to a linkage request from an user, second memory means for storing said linkage relation between said first file and said second file together with an indicator indicating a group of one or more users including said user for which said linkage relation is valid, and means for judging, in response to a request to access a file directed by said second file through said first file from a first user, whether said request is permissible by checking whether linkage relation between said first file and said second file is valid for said first user by searching said indicator in said second memory means.

2. A file management system according to claim 1, wherein said second one of said plurality of processing means further comprises:

third memory means for storing a second indicator which indicates a group of one or more users being permitted to provide linkage relation using a file stored in said second one of said plurality of processing means corresponding to said file; and means for responding to a request of a second user to link said file in said second one of said plurality of processing means by judging whether said second indicator being stored corresponding to said file indicates a group of one or more users including said second user by referring to said third memory means and outputting a result of judging whether said second indicator indicates said group to said first one of said plurality of processing means;

wherein said linking means of said first one of said plurality of processing means provides linkage relation corresponding to said result of said judging.

3. A file management system according to claim 1, wherein said first one of said plurality of processing means further comprises:

fourth memory means for storing a third indicator which indicates a number of users accessing said second file through said first file by using said linkage relation;

deleting means for deleting said linkage relation when said third indicator indicates zero.

4. A data terminal connected to at least one other data terminal through a data transmission line means comprising:

memory means for storing a plurality of ordinary files, a plurality of directory files for managing said plurality of ordinary files in tree structure and linking relations between each of said directory files and each of a plurality of directory files in said other data terminal according to each of a plurality of users or user programs; and processing means for judging, in response to a request to access a file directed by a second directory file in said other data terminal through a first directory file in said data terminal from a user or a user program, whether said data terminal should request said other data terminal to access said file directed by said second directory file by checking whether said first directory file is linked with said second directory file in said other data terminal according to said user or user program.

5. A data terminal according to claim 4, wherein said processing means accesses said file directed by said first directory file in said memory means in said data terminal if said first directory file is not linked with said second directory file according to said user or user program.

6. A data terminal according to claim 4, further comprising:

a number of memory means for storing at least one indicator which indicates a number of users or user programs accessing said file directed by said second directory file through said first directory file by using one of said linking relations and deleting means for deleting said one linking relation when said indicator indicates zero.

7. A file management terminal connected to at least one other file management terminal through a data transmission line means comprising:

memory means for storing a plurality of ordinary files, a plurality of directory fires for managing said plurality of ordinary files in tree structure, and linking relations between each of said directory files and each of a plurality of directory files in said other file management terminal according to each of a plurality of users or user programs; and processing means for judging, in response to a request to access a file directed by a second directory file in said other file management terminal through a first directory file in said file management terminal from an user or an user program, whether said file management terminal should request said other file management terminal to access said file directed by said second directory file by checking whether said first directory file is linked with said second directory file in said other file management terminal according to said user or user program.

8. A file management terminal according to claim 7, wherein said processing means accesses said file directed by said first directory file in said memory means in said file management terminal if said first directory file is not linked with said second directory file according to said user or user program.

9. A file management terminal according to claim 7, further comprising:

a number of memory means for storing at least one indicator which indicates a number of users or user programs accessing said file directed by said second directory file through said first directory file by using one of said linking relations and deleting means for deleting said one linking relation when said indicator indicates zero.

10. A data processing system including first data processing means and second data processing means connected to said first data processing means via transmission line means respectively, said first data processing means comprising:

first file memory means for storing a plurality of ordinary files and a plurality of directory files for managing said plurality of ordinary files in tree structure;

first linkage memory means for storing linking relation between a first directory file in said first data processing means and a second directory file in said second data processing means according to an user or an user program in response to a linkage request from said user or said user program; and processing means for judging, in response to a request to access a file directed by said second directory file in said second data processing means through said first directory file in said first data processing means from a first user or user program, whether said first data processing means should request said second data processing means to access said file directed by said second directory file by checking whether said first directory file is linked with said second directory file according to said first user or user program.

11. A data processing system according to claim 10, wherein said processing means accesses said file directed by said first directory file in said first linkage memory means in said first data processing means if said first directory file is not linked with said second directory file according to said first user or user program.

12. A data processing system according to claim 10, further comprising:
a number of memory means for storing an indicator which indicates a number of users or user programs accessing said file directed by said second directory file through a first directory file by using said linking relation and deleting means for deleting said linking relation when said indicator indicates zero.

13. A data processing system according to claim 10, wherein said second data processing means comprises:
second file memory means for storing files including a plurality of ordinary files and a plurality of directory files for managing said plurality of ordinary files in tree structure;
second linkage memory means for storing an indicator which indicates a group of one or more users or user programs being permitted to provide a linkage relation using a directory file stored in said second file memory means corresponding to said directory file; and
means for responding to a request of an user or an user program to link by using said file in said second data processing means by judging whether said indicator stored corresponding to said file directed by said second directory file indicates a group of one or more users including said user or user program by referring said second linkage memory means and outputting a result of judging whether said indicator indicates said group to said first data processing means;
wherein said first data processing means provides a linkage relation according to said user or user program corresponding to said result of judging whether said indicator indicates said group.

14. A file management system including first data processing means and second data processing means connected to said first data processing means via transmission line means respectively,
said first data processing, means comprising:
first file memory means for storing a plurality of ordinary files and a plurality of directory files for managing said plurality of ordinary files in tree structure;
first linkage memory means for storing linking relation between a first directory file in said first data processing means and a second directory file in said second data processing means according to an user or an user program in response to a linkage request from said user or said user program; and
processing means for judging, in response to a request to access a file directed by said second directory file in said second data processing means through said first directory file in said first data processing means from first user or user program, whether said first data processing means should request said second data processing means to access said file directed by said second directory file by checking whether said first directory file is linked with said second directory file according to said said user or user program.

15. A file management system according to claim 14, wherein said processing means accesses said file directed by said first directory file in said first linkage memory means in said first data processing means if said first directory file is not linked with said second directory file according to said first user or user program.

16. A file management system according to claim 14, further comprising:
a number of memory means for storing an indicator which indicates a number of users or user programs accessing said file directed by said second directory file through said first directory file by using said linking relation and deleting means for deleting said linking relation when said indicator indicates zero.

17. A file management system according to claim 14, wherein said second data processing means comprises;
second file memory means for storing files including a plurality of ordinary files and a plurality of directory files for managing said plurality of ordinary files in tree structure;
second linkage memory means for storing an indicator which indicates a group of one or more users or user programs being permitted to provide a linkage relation using a directory file stored in said second file memory means corresponding to said directory file; and
means for responding to a request of a second user or user program to link by using said file in said second data processing means by judging whether said indicator stored corresponding to said file directed by said second directory file indicates a group of one or more users including said second user or user program by referring said second linkage memory means and outputting a result of said judging operation to said first data processing means;
wherein said first data processing means provides a linkage relation according to said second user or user program corresponding to said result of judging whether said indicator indicates said group.

* * * * *